United States Patent [19]

Törneback

[11] 4,299,310
[45] Nov. 10, 1981

[54] ANTI-SKID DEVICE FOR MOTOR VEHICLES

[76] Inventor: Göran A. Törneback, Kälkvägen 11 B, Linköping, Sweden, S-582 69

[21] Appl. No.: 28,315

[22] Filed: Apr. 9, 1979

[30] Foreign Application Priority Data

Apr. 10, 1978 [SE] Sweden .................................. 7803996
Nov. 22, 1978 [SE] Sweden .................................. 7812029

[51] Int. Cl.³ .............................................. B60T 1/00
[52] U.S. Cl. ................................. 188/4 R; 152/208; 301/42
[58] Field of Search ............... 188/4 R, 4 B; 152/208, 152/214, 231, 233, 213 A, 213; 180/16; 301/42

[56] References Cited

U.S. PATENT DOCUMENTS

| 2,283,948 | 5/1942 | Ridgway | 188/4 B |
| 2,771,161 | 11/1956 | Jesionowski | 188/4 B |
| 2,865,471 | 12/1958 | Chaussee | 188/4 B |

FOREIGN PATENT DOCUMENTS

| 266487 | 10/1913 | Fed. Rep. of Germany. |
| 1162216 | 1/1964 | Fed. Rep. of Germany. |
| 2506880 | 8/1976 | Fed. Rep. of Germany. |
| 2036889 | 12/1970 | France. |
| 110674 | 11/1917 | United Kingdom. |

Primary Examiner—John E. Kittle
Assistant Examiner—Thomas Bokan
Attorney, Agent, or Firm—Sherman & Shalloway

[57] ABSTRACT

This invention relates to an anti-skid device for motor vehicles, which device is of the known kind at which a friction pulley abuts a drive wheel and the pulley is provided with chain links, the free ends of which are thrown in between the tire and the ground. The invention is characterized in that the friction pulley (8,19) is supported on one end of an arm (6), which at its other end is supported pivotally about a journal (5) rigidly connected to the vehicle or the spring system thereof, and pneumatic means (10) are provided by action of a control means in the driver's cab to swing the arm (6) with the pulley (8,19) from a protected non-operative position to a pneumatically resilient contact against the tire (23).

7 Claims, 4 Drawing Figures

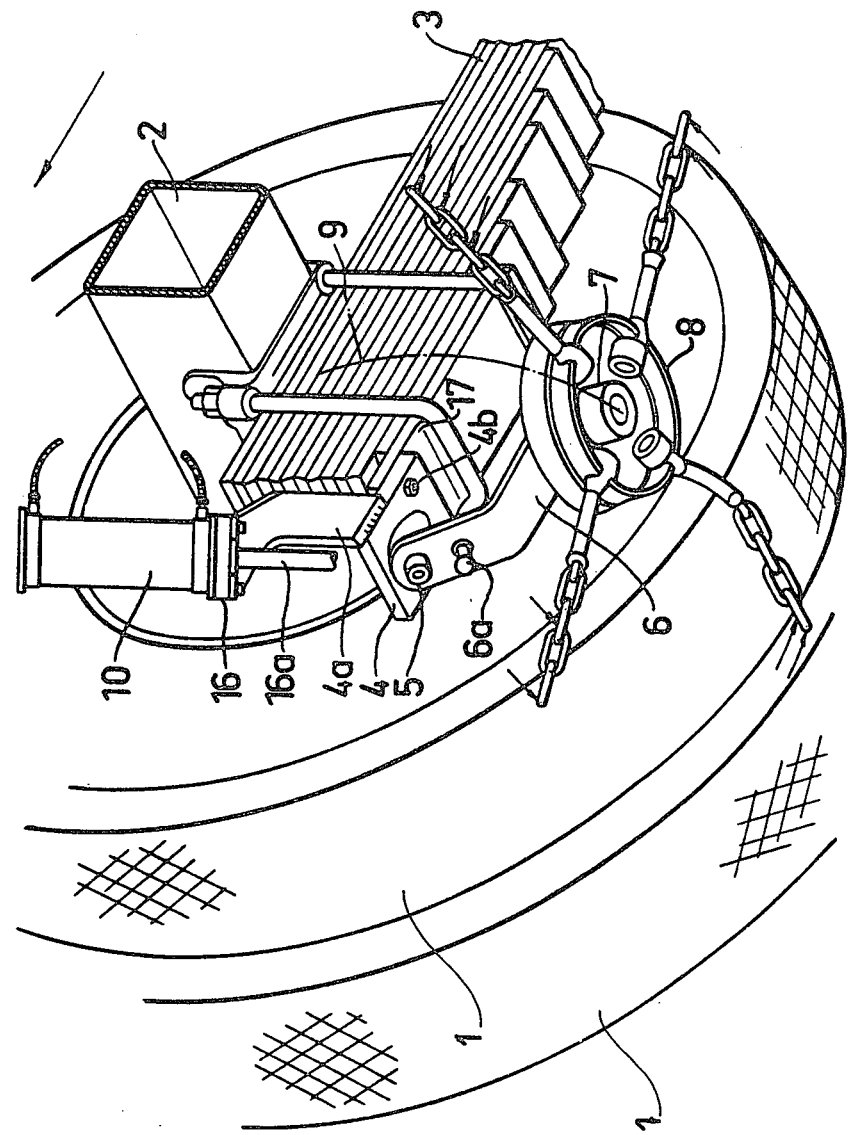

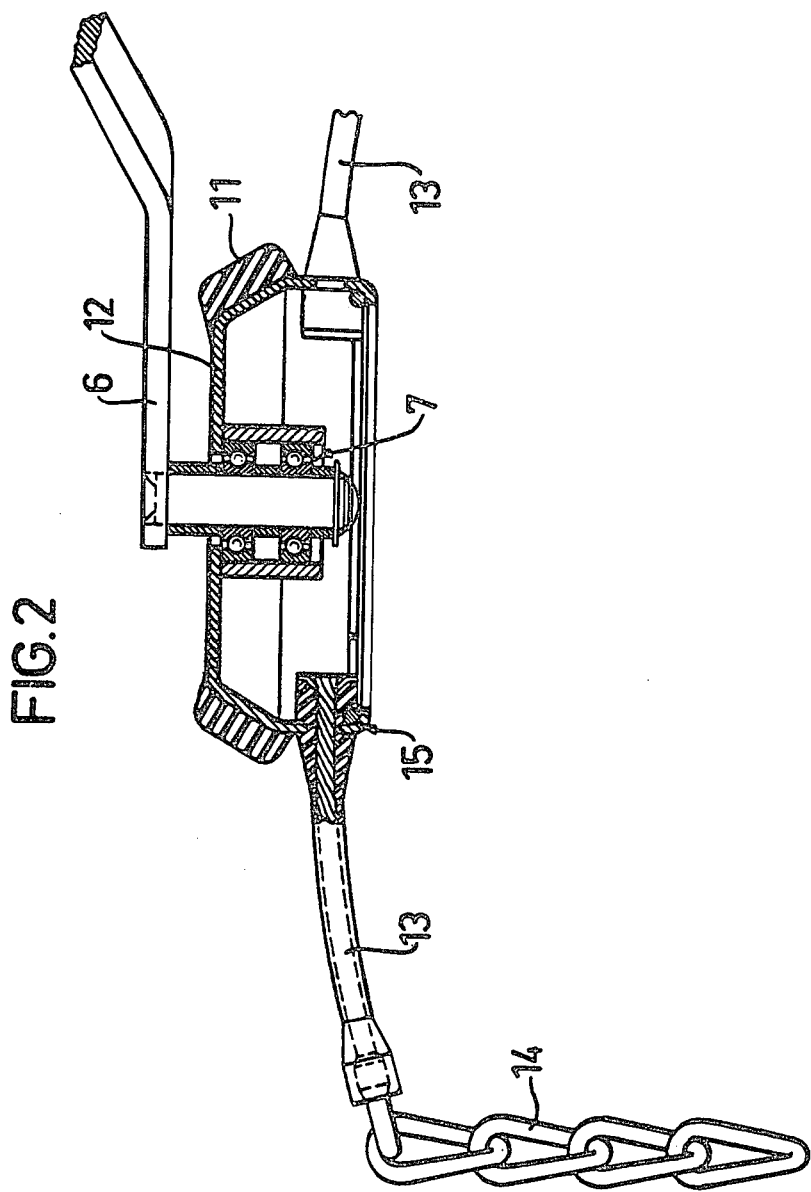

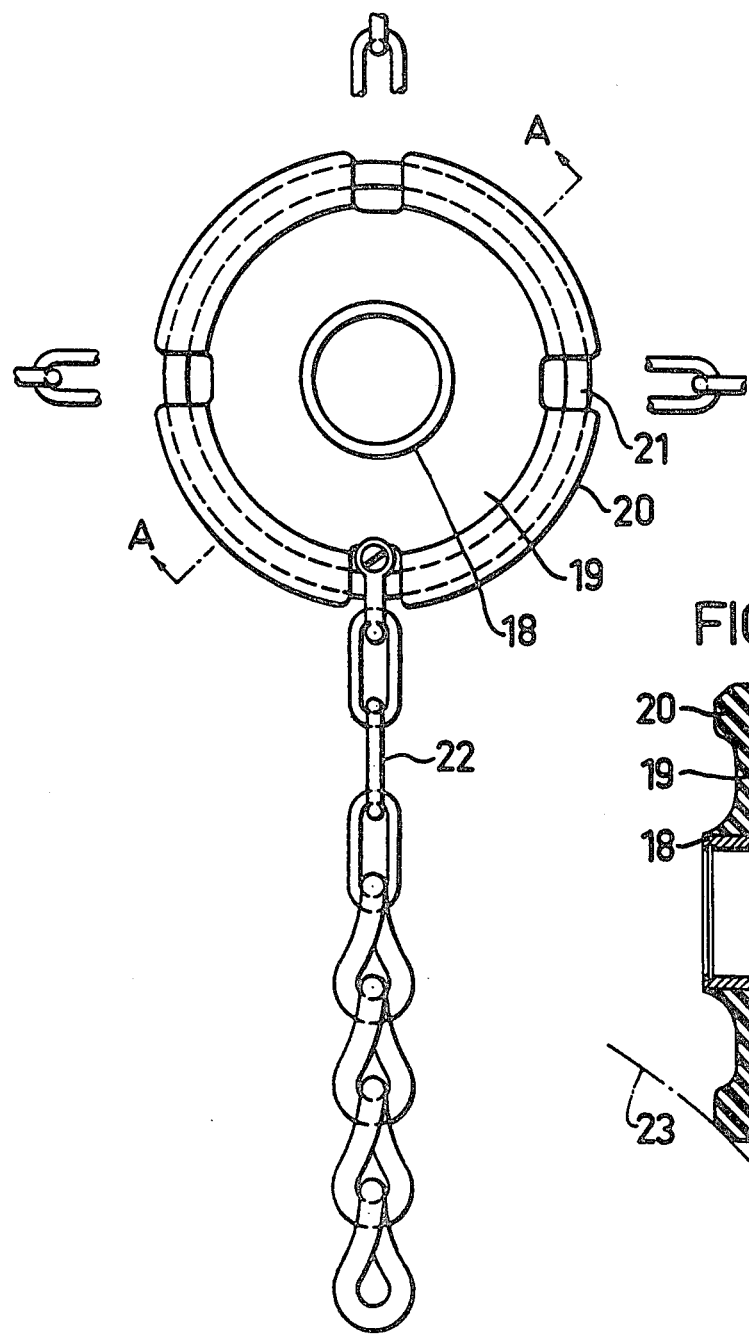

ANTI-SKID DEVICE FOR MOTOR VEHICLES

BACKGROUND OF THE INVENTION

1. Field of the Invention

This invention relates to an anti-skid device for motor vehicles, especially for trucks and heavier vehicles operating under severe conditions, particularly on ice and in snow or the like.

According to a very old idea a device has been proposed, which comprises a rotary spreader carrying a plurality of chain links or the like. The spreader is caused to abut one of the drive tires, and upon rotation of the spreader a number of chains or the like are driven between the tires and the underlying surface to increase the friction therebetween.

Devices according to the aforesaid idea are previously known, for example through British Pat. No. 110,674, French Pat. No. 2 036 889, German Laid Out Document No. 1 162 216, and many more. Although a great number of devices of this kind have been disclosed in patent literature, and several such devices have been demonstrated, not a single one knowingly is used generally in practice today, in spite of the satisfactory operation many of these devices have been alleged having shown when they were demonstrated.

There are several reasons for this phenomenon. Some of the constructions have been relatively complicated and, therefore, expensive. In view of the improvements made with respect to road maintenance and the like, the need of such devices has been deemed not to be sufficiently great to justify the high expenditures. Some of the known devices possibly have operated well under favorable conditions, but in practice may have experienced situations implying really troublesome conditions. One usual reason of failure appears to be the encroachment upon the ground clearance of the vehicle by the device, which thereby was deformed when it contacted stumps and similar terrain obstacles and, subsequently, did not function.

Several different reasons in combination may have prevented the development of a popular embodiment.

The development of the present invention was started with a study of the known ideas and a systematic testing of the disadvantages, in view of the fact that no construction of this kind had achieved wide application so far.

At a long series of experiments an essential problem was found being caused by the immense energy imparted to the outer ends of the chain links. When being guided in a wrong way and striking against suspension or bearing means, the resulting damage is substantial.

SUMMARY OF THE INVENTION

The following leading principles, therefore, have been outlined as essential:

1. The previously known drive of the anti-skid device by means of a friction pulley abutting the tire seems to be the simplest solution of synchronizing the circumferential speed between the tire and the anti-skid device (chains).

2. The drive pulley can not be made of a material other than rubber. Rubber causes the least possible wear on the tire and ensures a good grip even when water between the pulley and the tire may cause skidding.

3. The drive pulley with contact surfaces of rubber carries chains, which are held spaced apart from each other, for example by a rubber-enclosed portion, which prevents the chains from approaching one another and getting entangled.

4. It is desired that the driver from the driver's cab can engage and disengage the anti-skid device.

5. The engagement and disengagement should be effected pneumatically, because compressed air is available in the vehicle. Moreover, due to resilience between the drive pulley and the tire a constant contact pressure against the tire can be expected. Pneumatics, thus, permit the necessary adaptability when, for example, the tire is inclined or unsymmetrical. A suitably positioned spring, of course, may effect a similar result.

6. It is quite natural and has often been mentioned at previously known experiments, that the drive pulley with its chains or the like must be located near to the point of contact between the tire and the ground, and therefrom be movable to folded-up, i.e. non-operative position, where it is more or less protected by the rear axle and the cardan rod, so that the ground clearance of the vehicle is not really limited. This requirement is very essential, because many of the earlier proposals probably have failed, because the anti-skid device in the folded-up state was damaged, as mentioned, by stumps and the like.

The experiments acccording to the present invention have been dominated especially by the requirement in item 6, in order to obtain a bearing means for the anti-skid device at which the drive pulley and its holder are pivoted about a bearing journal secured in an attachment, which preferably is located beneath the spring assembly of the drive axle and in front of the axle center so as not to encroach more than a very small extent of the normal ground clearance of the vehicle.

These desires guided the experiments with a device of this kind, which experiments have resulted in a device as defined in the attached claims.

BRIEF DESCRIPTION OF THE DRAWINGS

The device according to the present invention is described in greater detail in the following, with reference to the accompanying drawings, in which FIG. 1 is a perspective view from below of a partially cut-off truck axle with two tires, the device according to the invention mounted beneath the spring assembly for the drive axle.

FIG. 2 shows on an enlarged scale a cut-through drive pulley with attached chains according to a first embodiment of the invention, FIG. 3 is a horizontal view of a modified drive pulley, and FIG. 4 is a section through the same drive pulley along the line A—A in FIG. 3.

In FIG. 1 the tires 1 and the rear axle 2 of a truck or the like are shown. The springs for the rear axle in this case form an assembly 3, which is rigidly secured at the rear axle 2. In connection to the lower surface of the spring assembly an attachment 4 is located, which supports an inclined bearing journal 5 for a swing arm 6, which in its turn supports a bearing 7 for a drive pulley 8, which in its outer position, i.e. outward and downward position is driven by the inside surface of the tire 1. The arm 6 is swung upward and inward about the bearing 5 in the attachment 4 to the non-operative position indicated by a dash-dotted path 9. In this position the drive pulley 8 is located protected between the spring assembly and the rear axle.

The swing movement of the swing arm 6 with the drive pulley 8 is effected by means of a compressed-air actuated cylinder 10, the compressed-air supply to which is controlled by a suitable means, which normally preferably is located in the driver's cab. For example, a manually and/or automatically controlled means can be located in the driver's cab to control the pressure to the cylinder and to release the pressure from the cylinder. The driver, thus, has the possibility to direct compressed air via the control means to the cylinder 10, whereby the drive pulley 8 is swung down into operative position in contact with the tire 1. The contact pressure against the tire hereby is pneumatically resilient, and the cylinder 10 is retained at an arm 4a, which extends from the attachment 4, by means of a resilient rubber member 16. The piston rod 16a of the cylinder operates against a ball joint 6a rigidly mounted at the arm 6 and via these members effects the swing movement of the arm 6, whereby the center of the bearing 7 describes the aforesaid dash-dotted path 9 in FIG. 1. The piston rod thus first effects in one direction a swing movement of the spreader pulley from the non-operative to the contact position and thereafter maintains a contact pressure against the tire. A return spring is provided within the cylinder to return the spreader pulley to the non-operative position.

FIG. 2 shows an embodiment of the drive pulley with the chains in a non-operative position. The chain links 14 freely suspend down from the plate 12, but are held spaced apart from each other by steel wires having an inner portion and an outer portion or the like 13 coated with rubber. The inner portion of the rubber coating thereof is formed with a rubber head of such a shape, that the rubber coated steel wires 13 and the chains or chain links 14 easily can be exchanged. The rubber head may be designed as a bayonet lock, but at the embodiment shown the heads are locked detachably by means of a common resilient locking ring 15. The outer portions of the rubber coated steel wires are connected to the chains 14.

The drive pulley 8 is supported at the arm 6 by double ball bearings, the position of which on the slightly elongated journal can be adjusted by the exchange of distance rings on both sides of the bearing.

In the embodiment of the drive pulley shown in FIG. 2 its outer driven portion 11 is made of rubber. The plate 12 is designed as a body of steel or aluminum, which at its periphery is provided with retaining means for one end of the chain links 13,14. As already mentioned, it was found suitable that the inner portion of the chain 14 transforms into a reinforced rubber member 13, which is detachably connected to the body 12 by means of a quick-coupling 15 with resilient properties. The free (outer) end of the links 14 may be designed in the same way as normal snow chains or be provided with rolled links.

Rolled links have a limited torsional capacity relative one another and in certain cases have proved to provide a better grip than links, of which the outermost link can rotate through several revolutions and, consequently, involves a certain rolling effect before a grip effect is obtained. The reinforced rubber members 13 have the advantage, that the free link ends 14 in lifted position are held at such a distance from each other so that twisting cannot occur. The rubber members, also, contribute in preventing unnormal wear of the tire. When the pneumatic pressure from the cylinder 10 causes the outer portion 11 of the drive pulley to resiliently abut the tire 1, the pulley 11 takes part in the rotation of the wheel (drive wheel), whereby the centrifugal force throws the links 14 outward, and every link near the tire 1 is driven between the tire and the road surface. The grip between the tire and the road, for example in snow or on ice, hereby is improved substantially, and especially the starting of heavy vehicles is facilitated on a ground where otherwise the wheels would spin.

In FIGS. 3 and 4 a modified embodiment of the drive pulley is shown. The pulley hub in these Figures is designated by 18, and the pulley proper by 19. The outer periphery is formed by a rubber ring 20, which is assembled of sectors and includes a steel ring 21 vulcanized therein. The rubber ring 20 as shown in FIG. 3 is broken in four places to provide space for chains, indicated at 22, to be directly hooked about the steel ring 21.

FIG. 4 shows the same pulley cut through, and the section of the pulley 19 designed with uniform thickness from a centrifugal force point of view. This implies that the pulley is thickest nearest to the hub and decreases in thickness in outward direction. Its periphery is reinforced about the ring 21 with a retaining grip about the main portion thereof. The advantage obtained hereby is that the pulley 19 has relatively good possibilities of being elastic, implying that the ring 21 can be positioned slightly obliquely relative to the hub when outside forces demand so, and that these movements are not transferred from the outer ring 20 to the retaining means.

The pulley preferably is made of a rubber with a hardness of about 60–70 Shore, and the steel ring 21 preferably is designed entirely closed, by welding or the like, because the forces arising from the chains are substantial.

As appears from FIG. 4, the ring 21 is vulcanized in closer to one edge of the pulley in order to increase the tread against the tire 23.

In this connection it should be mentioned, that is was found advantageous to position the pulley so that in the drive position its center is located slightly behind the center of the truck wheel, with respect to the driving direction. This arrangement provides the best possible feed condition when the chains are thrown in between the tire (indicated at 23) and the ground, and it also substantially reduces the stresses compared to the pulley center located directly in front of or before the tire center. In addition, the skid preventing effect is higher.

At field tests the best results so far have been obtained with a drive pulley of the kind described above with reference to FIGS. 3 and 4, which pulley, however, was provided with links of the kind shown in FIGS. 1 and 2, reinforced closest to the pulley by vulcanization. The drive pulley with the steel ring vulcanized therein does not permit any stretching, but retains the chains firmly and reliably. However, owing to the relatively great flexibility of the pulley proper between the steel ring and the hub, the greatest running irregularities are balanced. The stiffening of the chains, for example as shown in FIGS. 1 and 2, not only reduces the risk of the chains getting entangled and thereby cause serious damage, but it also seems to dampen the "lashing effect", in which the ends of the chains can be caused to carry out extremely forceful strokes to the ambient.

At the field tests carried out to develop the anti-skid device according to the invention, it was found expedient to introduce automatic disengagement of the anti-skid device, i.e. to automatically swing upward the device into nonoperative position when the speed of the vehicle exceeds 25–35 kilometers per hour. The disengagement means should be designed so as to render engagement impossible when the speed exceeds the predetermined limit. As transmitter for the disengagement means, which may be of known valve type, preferably a low gear speed detent is used which already is installed in most trucks and normally operates within just the speed range 25–35 km/hour.

At a certain limit speed which, of course, varies for different vehicles, loads and road surfacings, but normally lies within the aforesaid range, certain side effects arise due to the rapid stretching of the chains by action of the centrifugal force and due to the heavy blows against the tire and surrounding areas. Vibrations resulting therefrom directly can deteriorate the road grip. It is very probable that effects of this kind have stood in the way of the great number of previous constructions. According to the present invention, a remarkably vibration-free operation of the anti-skid device is obtained, and the automatic disengagement and, respectly, corresponding engagement detent at a certain predetermined speed, therefore, is an essential detail completing the structural design.

In order to facilitate the mounting and dismounting of the device, it was found advantageous to design the carrying plate 4 with the arm 4a in one piece, which is attached by bolts to the clamping plate 17 for the spring assembly 3. The clamping plate 17 is elongated slightly in order to constitute an attachment for the device. When the device is to be mounted on a truck, the normal clamping plate merely is to be replaced by the elongated one. The entire device then is mounted and dismounted by means of two bolts, one of which is indicated at 4b.

The combination described above and comprising partly known details and partly new ones has proved to be a device providing efficient anti-skid protection under severe conditions and, therefore, is of great importance for the capacity of the vehicle to advance, especially under difficult winter conditions.

What I claim is:

1. An anti-skid device for motor vehicles comprising a spreader pulley centrally supported for rotation, said spreader pulley has evenly spaced at the periphery edge of said pulley a plurality of chains, said chains being spaced apart by steel wires having an inner portion and an outer portion and coated with rubber, the inner portion of said rubber coated steel wires being connected to said pulley and the outer portion of said steel wires being connected to said chains, the spacing of said steel wires around the periphery of said spreader being such that the chains are prevented from approaching one another and getting entangled and a periphery portion of the pulley adapted for frictional engagement with the inward surface of a tire on a drive wheel of a vehicle and by action of the friction therebetween to rotate such that the chains by effect of centrifugal force extend substantially perpendicularly outward from their center of rotation and are thereby driven between the tire and the ground, said spreader pulley being supported rotatably on one end of an arm which at its other end is pivotally supported about an inclined journal, said inclined journal serving as a center for a pivotal movement of the spreader pulley with respect to said inclined journal from a protected non-operative position, inward and upward and to an operative position, outward and downward in contact with the tire, said arm being actuated by a pneumatic cylinder having a piston rod which effects in one direction a swing movement of the spreader pulley from the non-operative position to the contact position and thereafter maintains a contact pressure against the tire and further including spring means for returning the spreader pulley to the non-operative position, and manual control means for controlling the cylinder to provide pressure to and, respectively, release pressure from the cylinder.

2. The anti-skid device of claim 1 wherein the center of the spreader pulley in operative position is located slightly behind the center of the driving direction of the vehicle.

3. The anti-skid device of claim 1 wherein the inclinded journal for the arm is detachably mounted on an elongated clamping plate beneath the spring assembly of the vehicle axle.

4. The anti-skid device of claim 1 wherein the chains are connected to the drive pulley by a steel wire coated with rubber, the inner portion of the rubber coating forming a connecting means for connecting the chain and steel wire to the drive pulley.

5. The anti-skid device of claim 1 wherein said means for returning the spreader pulley to the non-operative position consists of spring means located within said cylinder.

6. The anti-skid device of claim 1 wherein the inner portion of the rubber coating connected to the pulley is formed as a bayonet lock and is detachably connected to said pulley by a resilient locking ring.

7. The anti-skid device of claim 1 wherein said pulley is formed from rubber and consists of an inner rubber body portion and an outer periphery rubber portion which outer portion encloses a steel ring, said outer periphery rubber portion having a plurality of spaced cut sections, and the inner portions of said rubber coated steel wires being detachably connected at said cut sections to said steel ring.

* * * * *